United States Patent
Parker et al.

(10) Patent No.: US 12,053,942 B2
(45) Date of Patent: Aug. 6, 2024

(54) STRINGER MANUFACTURING SYSTEM USING A CAUL

(71) Applicant: The Boeing Company, Chicago, IL (US)

(72) Inventors: Mary LeAnn Parker, Snohomish, WA (US); Khanh Mai Pham, Renton, WA (US); Jonathan Santiago, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 17/647,417

(22) Filed: Jan. 7, 2022

(65) Prior Publication Data

US 2023/0219308 A1   Jul. 13, 2023

(51) Int. Cl.
*B29C 70/34* (2006.01)
*B29C 70/54* (2006.01)
*B29L 31/30* (2006.01)

(52) U.S. Cl.
CPC .......... *B29C 70/549* (2021.05); *B29C 70/342* (2013.01); *B29C 70/543* (2013.01); *B29L 2031/3076* (2013.01)

(58) Field of Classification Search
CPC ..... B29C 70/342; B29C 70/549; B29C 70/44; B29C 43/56; B29C 2043/562; B29C 70/446
See application file for complete search history.

(56) References Cited

U.S. PATENT DOCUMENTS

| 2008/0116618 | A1* | 5/2008 | Martin | B29D 99/0014 425/383 |
| 2012/0055617 | A1* | 3/2012 | Van Vuegt | B29D 99/0014 156/443 |
| 2017/0036310 | A1* | 2/2017 | Matsen | B29C 70/549 |
| 2020/0262160 | A1* | 8/2020 | Register | B29C 70/44 |

* cited by examiner

*Primary Examiner* — Yunju Kim
(74) *Attorney, Agent, or Firm* — Yee & Associates, P.C.

(57) ABSTRACT

A method, apparatus, system, and computer program product for fabricating a composite part. Composite materials are laid up on a mandrel. A caul is placed over the composite materials laid up on the mandrel. An inner mold line of the caul is sized to an outer surface of the composite materials in a cured state. The composite materials laid up on the mandrel with the caul over the composite materials is cured to form the composite part. The composite materials expand to the inner mold line of the caul during curing of the composite materials to form the composite part.

25 Claims, 13 Drawing Sheets

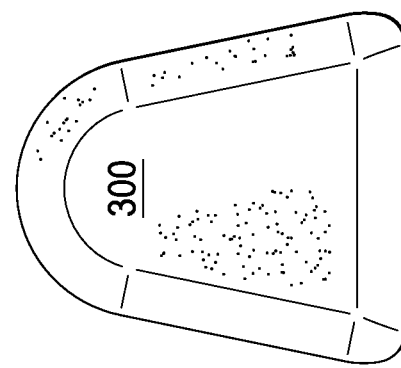

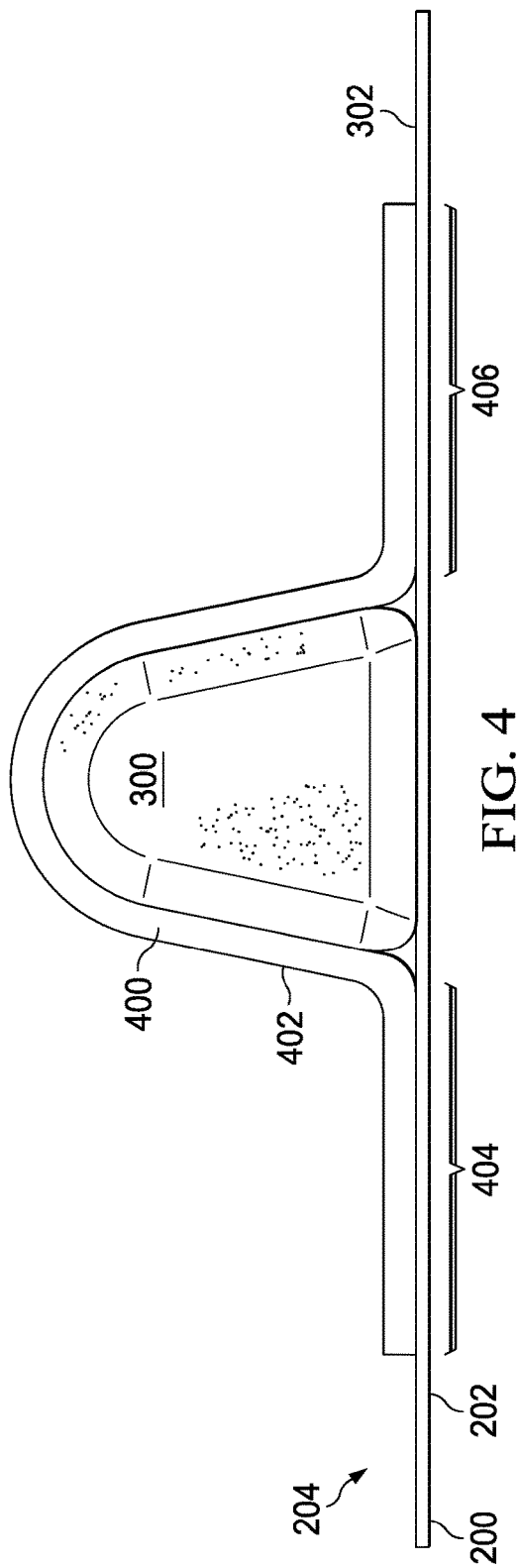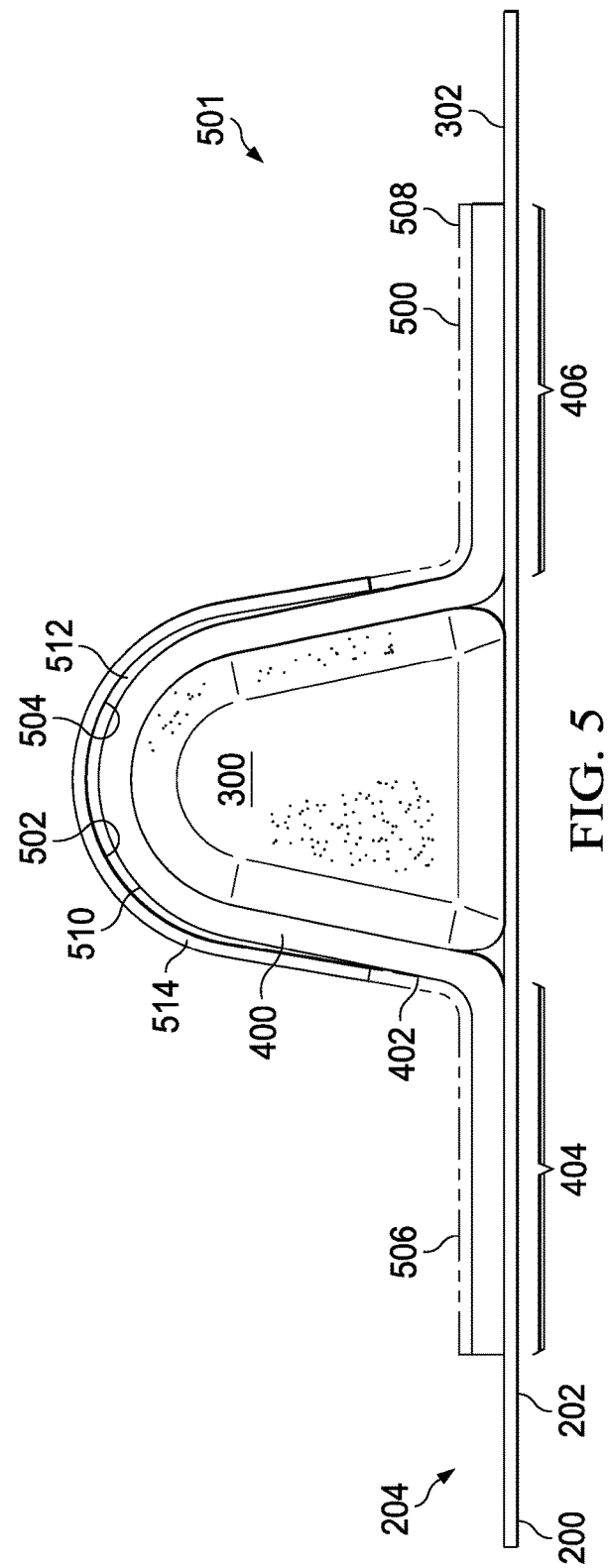

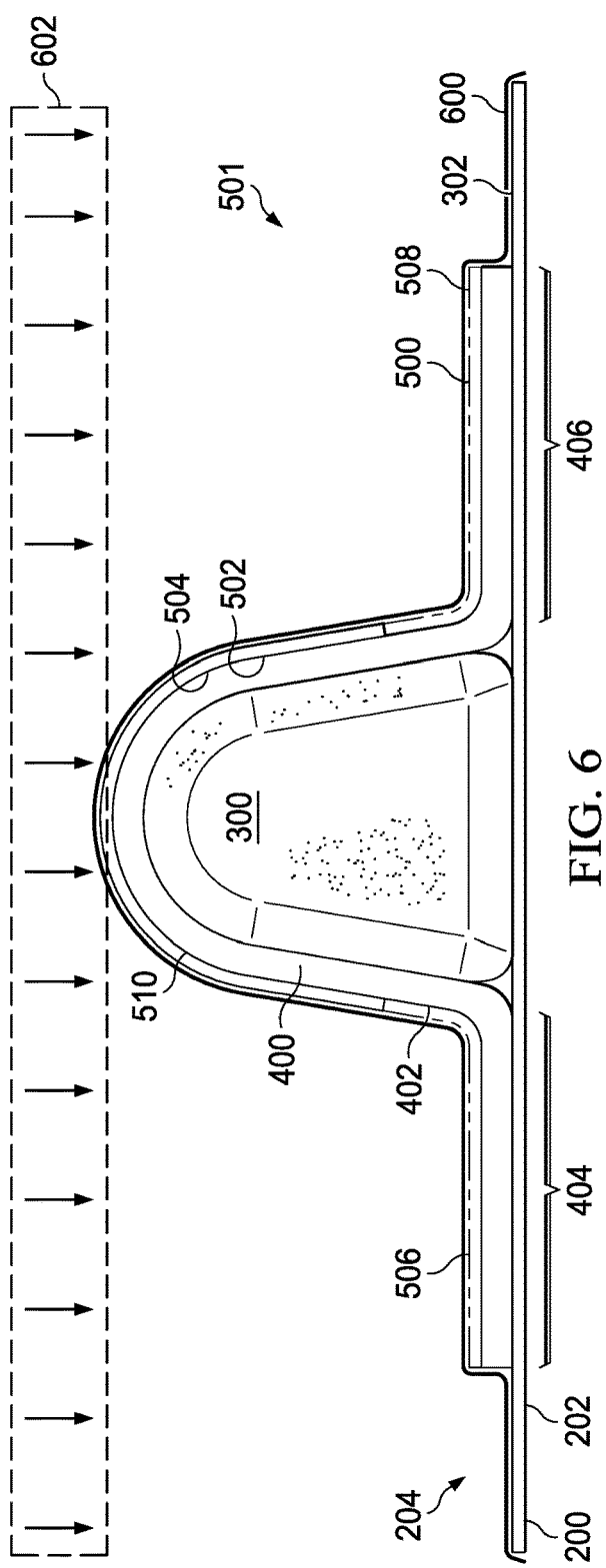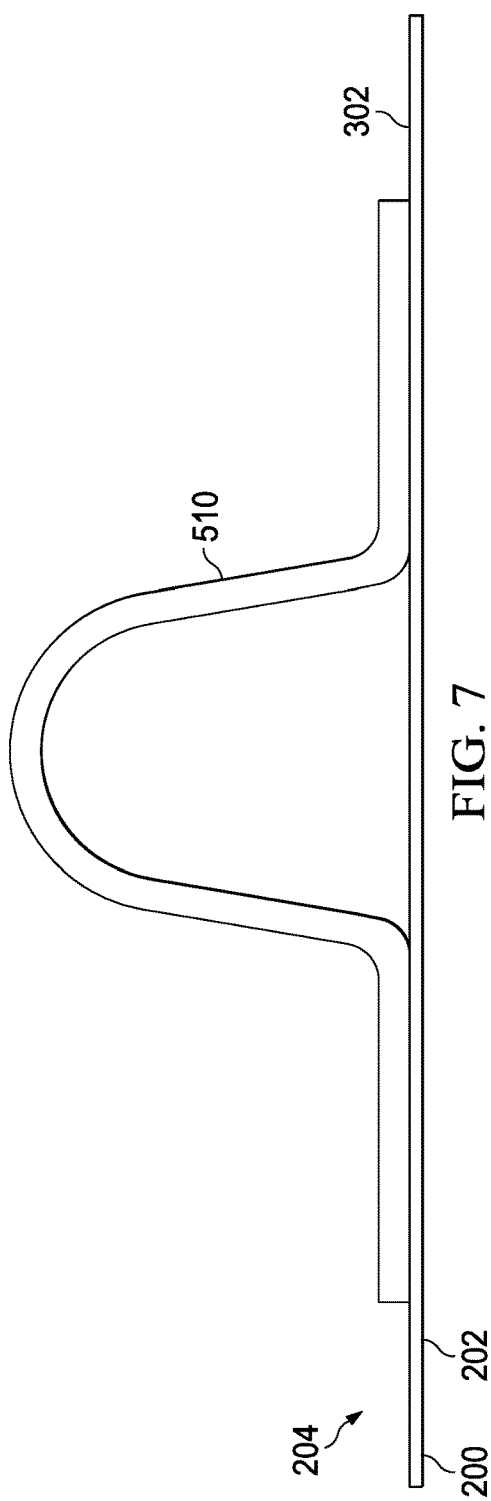

STRINGER MANUFACTURING SYSTEM USING A CAUL

BACKGROUND INFORMATION

1. Field

The present disclosure relates generally to an improved composite manufacturing system and in particular, to a method, apparatus, system, and computer program product manufacturing stringers.

2. Background

Aircraft are being designed and manufactured with greater and greater percentages of composite materials. Composite materials are used in aircraft to decrease the weight of the aircraft. This decreased weight can improve performance features such as payload capacity and fuel efficiency. Further, composite materials provide longer service life for various components in an aircraft.

Composite materials can be tough, light-weight materials created by combining two or more functional components. For example, a composite material can include reinforcing fibers bound in a polymer resin matrix, such as a carbon fiber reinforced polymer (CRFP). The fibers can be unidirectional, such as a tape or a tow or can take multidirectional, such as a woven cloth or fabric. The fibers and resins can be arranged and cured to form a composite structure.

Using composite materials to create aerospace composite structures can allow for portions of an aircraft to be manufactured in larger pieces or sections. For example, a fuselage in an aircraft can be created in cylindrical sections to form the fuselage of the aircraft. Other examples include, without limitation, wing sections joined to form a wing or stabilizer sections joined to form a stabilizer.

In manufacturing composite structures, layers of composite material can be laid up on a tool. The layers of composite material may be comprised of fibers in sheets. These sheets can take the form of, for example, without limitation, fabrics, tape, tows, or other suitable configurations for the sheets. In some cases, resin can be infused or pre-impregnated into the sheets. These types of sheets are commonly referred to as prepreg.

The different layers of prepreg can be laid up in different orientations and different numbers of layers can be used depending on the desired thickness of the composite structure being manufactured. These layers can be laid up by hand or using automated lamination equipment such as a tape laminating machine or a fiber placement system.

After the different layers have been laid up on the tool, the layers can be consolidated and cured upon exposure to temperature and pressure, thus forming the final composite structure. With respect to the services of composite parts such as large hat stringers, a bag can be used on the outer surface of the hat stringer to reduce undesired inconsistencies in the outer surface of the hat stringer. The surface quality, however, can be lower than desired.

Therefore, it would be desirable to have a method and apparatus that take into account at least some of the issues discussed above, as well as other possible issues. For example, it would be desirable to have a method and apparatus that overcome a technical problem with manufacturing composite parts such as hat stringers.

SUMMARY

An embodiment of the present disclosure provides a method for fabricating a composite part. composite materials are laid up on a mandrel. A caul is placed over the composite materials laid up on the mandrel. An inner mold line of the caul is sized to an outer surface of the composite materials in a cured state. The composite materials laid up on the mandrel with the caul over the composite materials is cured to form the composite part. The composite materials expand to the inner mold line of the caul during curing of the composite materials to form the composite part. According to other illustrative embodiments, an apparatus, a system and a computer program product for fabricating a composite part are provided.

Another embodiment of present disclosure provides a method for fabricating a composite part A method for fabricating a stringer. Composite materials for the stringer are laid up on a mandrel. A caul is placed over the composite materials for the stringer laid up on the mandrel. A gap is present an inner mold line of the caul and the composite materials. The composite materials for the stringer laid up on the mandrel with the caul over the composite materials to form the stringer. The composite materials expand to the inner mold line of the caul during curing of the composite materials to form the stringer such that the composite materials for the stringer are sandwiched between the caul and the mandrel after curing. According to other illustrative embodiments, an apparatus, a system and a computer program product for fabricating a composite part are provided.

Yet another embodiment of the present disclosure provides a method for forming a caul. Composite layers are laid up on a tool. The tool defines an inner mold line for the caul. The composite layers are cured to form the caul. The inner mold line of the caul is sized to an outer surface of composite materials for a composite part in a cured state. According to other illustrative embodiments, an apparatus, a system and a computer program product for fabricating a composite part are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a skin panel in accordance with an illustrative embodiment;

FIG. 3 is an illustration of a mandrel on composite materials for skin panel in accordance with an illustrative embodiment;

FIG. 4 is an illustration of composite materials for a hat stringer laid upon a mandrel with an illustrative embodiment;

FIG. 5 is an illustration of a caul over composite materials for a hat stringer laid up on a mandrel in accordance with an illustrative embodiment;

FIG. 6 is an illustration of curing composite materials for a composite part in accordance with an illustrative embodiment;

FIG. 7 is an illustration of a composite part performed using a caul in accordance with an illustrative embodiment;

DETAILED DESCRIPTION

The illustrative embodiments recognize and take into account one or more different considerations. For example, the illustrative embodiments recognize and take into account that a caul can provide a higher level of service quality as compared to using a bag in curing a composite parts such as a stringer, and in particular, a hat stringer.

The illustrative embodiments recognize and take into account that it becomes infeasible to use caul to form a stringer such as a hat stringer as the size of the hat stringer increases. The illustrative embodiments recognize and take into account that large hat stringer such as those used for aircraft wings do not work well. The illustrative embodiments recognize and take into account that the composite materials for the hat stringer are typically laid up on a solid mandrel. The illustrative embodiments recognize and take into account that the caul can expand during curing and change the shape of the hat structure. The illustrative embodiments recognize and take into account that currently cauls are matched to the green state geometry of composite materials for a composite part. A green state geometry is the geometry of the composite material in an uncured state. As a result, the use of a caul for a stringer is impractical because of the expansion of the solid mandrel during curing of the composite materials.

The illustrative embodiments recognize and take into account that one solution involves manufacturing a caul to have dimensions that are oversized for the green state geometry of the composite part. Illustrative embodiments recognize and take into account that this oversizing in the selected such that the geometry of the inner mold line of the caul matches that of the composite part after expansion during curing.

Thus, the illustrative embodiments provide a method, apparatus, system, and computer program product for fabricating a composite part. In one illustrative example, composite materials are laid upon on a mandrel. A caul is placed over the composite materials laid upon the mandrel, wherein an inner mold line of the caul is sized to an outer surface of the composite materials in a cured state. The composite materials laid up on the mandrel with the caul over the composite materials are cured to form the composite part. The composite materials expand to the inner mold line of the caul during curing of the composite materials to form the composite part.

Figure 1:
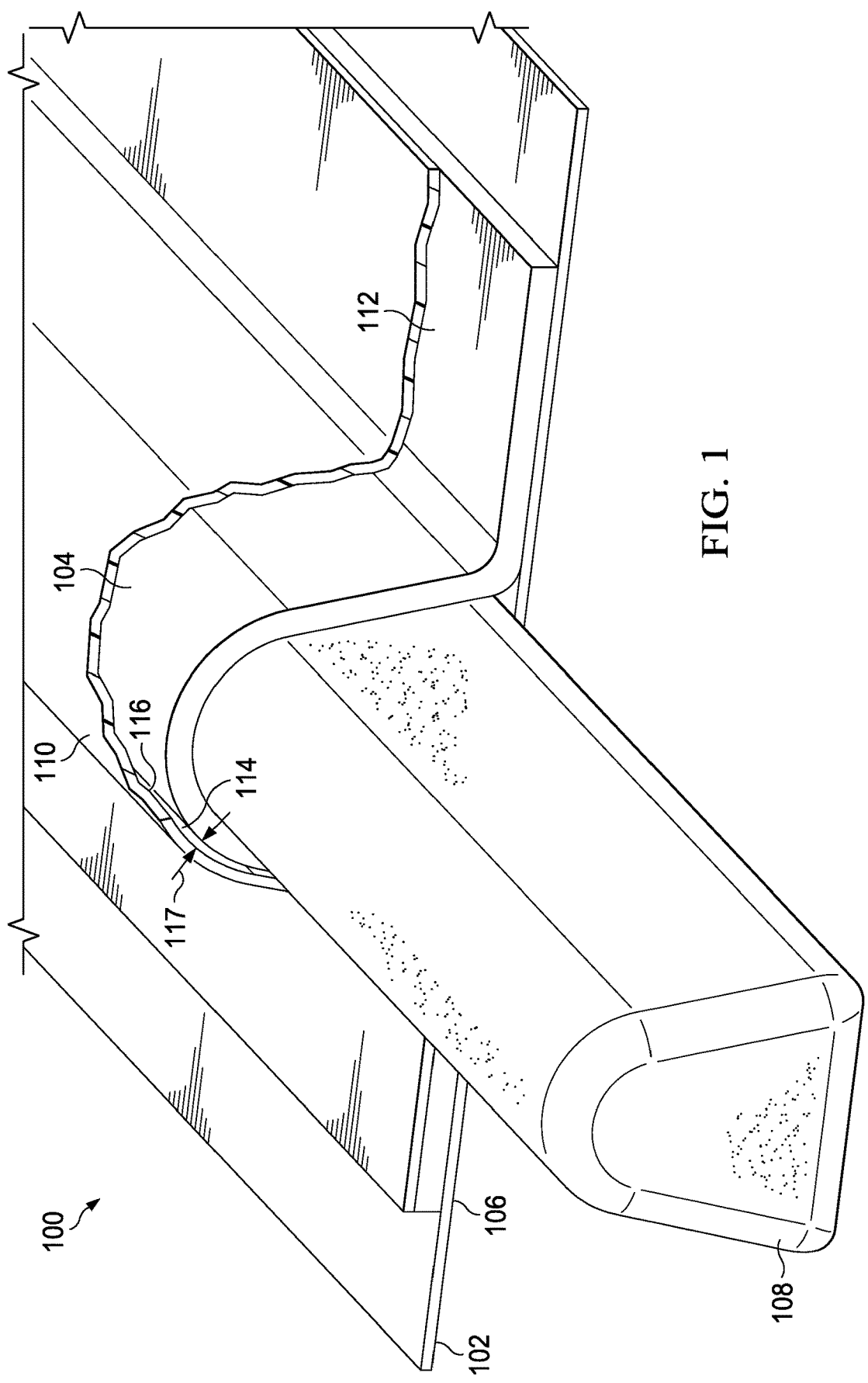
FIG. 1 is an illustration of a length of composite materials for a composite part in accordance with an illustrative embodiment.
Figure 8:
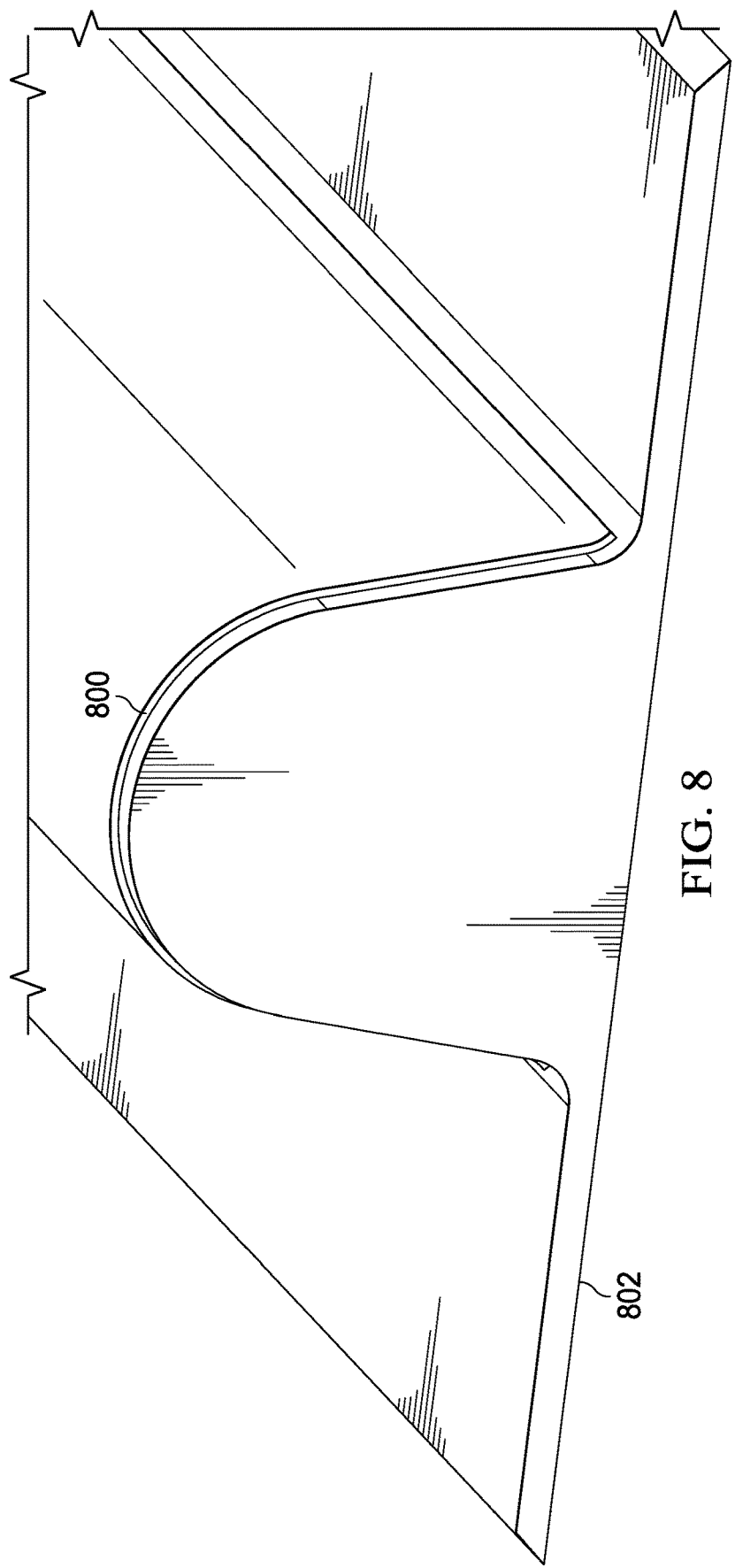
FIG. 8 is an illustration of a first ply on a tool for fabricating a caul in accordance with an illustrative embodiment.

With reference now to the FIGURES, in particular, with reference to FIG. 1, an illustration of a length of composite materials for a composite part is depicted in accordance with an illustrative embodiment. In this illustrative example, composite part 100 is shown in an uncured state and comprises composite materials 102 for hat stringer 104 and skin panel 106. As depicted, composite materials 102 are in an uncured state. This uncured state is also referred to as a green state for composite materials 102 laid up to form a shape for composite part 100.

As depicted, mandrel 108 is located on composite materials 102 for skin panel 106. Mandrel 108 is a solid mandrel in this example. Composite materials 102 for hat stringer 104 are laid up on mandrel 108 and composite materials 102 for skin panel 106.

In this illustrative example, caul 110 is located on composite materials 102 for hat stringer 104. In this example, a portion of caul 110 has been removed in this view to expose outer surface 112 of composite materials 102 for hat stringer 104.

In this exposed view of hat stringer 104, gap 117 is present between surface 114 of inner mold line 116 of caul 110 and outer surface 112 of composite materials 102 for hat stringer 104. Gap 117 is present because the configuration of caul 110. Caul 110 has dimensions that take into account the expansion of composite materials 102 during curing of composite materials 102.

For example, during curing, heat causes mandrel 108 to expand to push composite materials 102 for hat stringer 104 against surface 114 of inner mold line 116 for inner mold line 116. In this illustrative example, caul 110 is sized to outer surface 112 of composite materials wanted to in a cured state.

The dimensions for caul 110 can be such that composite materials 102 for hat stringer 104 expand to inner mold line 116 for hat stringer 104 to have desired dimensions. In this illustrative example, the desired dimensions can be dimensions that are within a tolerance of value specified in a design or specification for hat stringer 104.

Additionally, outer surface 112 of composite materials 102 for hat stringer 104 can have a desired level of quality after curing composite materials 102 because of the expansion of composite materials wanted to against surface 114 of inner mold line 116 for caul 110. For example, with this sizing of caul 110, undesired inconsistencies (not shown) selected from at least one of a resin ridge, a poor radii quality, wrinkling, or other undesired surface qualities can be reduced or absent.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to FIGS. 2-7, an illustration of a process for forming a composite part using a caul is depicted in accordance with an illustrative embodiment. With reference to FIG. 2, an illustration of a skin panel is depicted in accordance with an illustrative embodiment. Composite materials 200, a composite component, such as skin panel 202, in composite part 204, is depicted from an end view.

With reference now to FIG. 3, an illustration of a mandrel on composite materials for skin panel is depicted in accordance with an illustrative embodiment. In this FIGURE, mandrel 300 is placed on surface 302 of composite materials 200 for skin panel 202 in composite part 204. In this illustrative example, the mandrel can be selected from one of a solid mandrel and a solid bladder.

Turning next to FIG. 4, an illustration of composite materials for a hat stringer laid upon a mandrel is depicted in accordance with an illustrative embodiment. In this example, mandrel 300 is placed on composite materials 200 for skin panel 202 as depicted in FIG. 3 prior to laying up composite materials 400 for hat stringer 402.

In this illustrative example, composite materials 400 for hat stringer 402 in composite part 204 are shown laid up on mandrel 300. As depicted, composite materials 400 for hat stringer 402 contact mandrel 300. Additionally, section 404 and section 406 of composite materials 400 for hat stringer 402 also contact composite materials 200 for skin panel 202.

In FIG. 5, an illustration of a caul over composite materials for a hat stringer laid up on a mandrel is depicted in accordance with an illustrative embodiment. In this example, caul 500 is placed over composite materials 400 for hat stringer 402 to form assembly 501. In this illustrative example, by being placed over composite materials 400, a portion, section 506, and section 508, of caul 500 can be in contact with composite materials 400. Another portion of caul 500, section 514, is not in contact with composite materials 400.

As depicted, caul 500 has inner mold line in which surface 504 of inner mold line is in contact with section of composite materials 400 for hat stringer 402. In this illustrative example, section 506 and section 508 of inner mold line 502 is in contact with composite materials 400 for hat stringer 402.

As shown in this FIGURE, gap 512 is present between section 514 of inner mold line 502 and composite materials 400 for hat stringer 402. In other words, surface 504 in section 514 of inner mold line 502 is not in contact with outer surface 510 of composite materials 400 in this section of caul 500.

In this illustrative example, inner mold line 502 of caul 500 is sized to outer surface 510 of composite materials 400 for hat stringer 402 in a cured state. In other words, curing of composite materials 400 results in an expansion of composite materials 400 to inner mold line 502 caul 500.

Turning next to FIG. 6, an illustration of curing composite materials for a composite part is depicted in accordance with an illustrative embodiment. In this illustrative example, vacuum bag 600 encloses assembly 501 such that a vacuum can be drawn during curing of assembly 501. In other words, enclosing composite materials 400 laid up on mandrel 300 with caul 500 on composite materials 400 and composite materials 200 for skin panel 202 are enclosed in vacuum bag 600 prior to curing composite materials 400 and composite materials 200.

In this illustrative example, the curing can be performed by applying heat 602 to assembly 501. Heat 602 can be applied using equipment such as an autoclave (not shown) in which assembly 501 can be placed. In this illustrative example, heat 602 can be applied to co-cure composite materials 400 for hat stringer 402 laid up on mandrel 300 with caul 500 over composite materials 400 for hat stringer 402 with additional composite materials, composite materials 200 for a composite component, such as skin panel 202.

As depicted, composite materials 400 for hat stringer 402 expands to inner mold line 502 of caul 500 during curing of composite materials 200 and composite materials 400 to form composite part 204 in a cured state. In this cured form, composite materials 200 are sandwiched between mandrel 300 and caul 500. In other words, the curing of these composite materials in assembly 501 results in the formation of composite part 204. In this illustrative example, curing of composite materials 400 for hat stringer 402 on mandrel 300 to form composite part 204 can result in mandrel 300 expanding to push composite materials 400 against inner mold line 502 of caul 500 during curing of composite materials 400.

Additionally, composite materials 400 can also expand during curing. In this illustrative example, the design of caul 500 can also take into account that caul 500 can expand during curing such that inner mold line of caul 500 defines dimensions for outer surface 510 of composite part 204 within the tolerance for composite part 204. The amount of expansion of these different components depends on the thermal coefficient of expansion (CTE) for the different materials in the composite materials 400, mandrel 300, and caul 500.

With reference to FIG. 7, an illustration of a composite part performed using a caul is depicted in accordance with an illustrative embodiment. As depicted, vacuum bag 600, caul 500, and mandrel 300 have been removed after the curing process, leaving composite part 204 comprising hat stringer 402 and skin panel 202.

The illustration of the process for forming a composite using a caul in FIGS. 2-7 is presented as an example of one manner in which the composite part can be fabricated using a caul sized to an expanded state of the composite part and occurs during curing to form the composite materials in the green state. This illustration is not meant to imply limitations to the manner in which the illustrative examples can be implemented.

For example, one or more cauls can be used in addition to caul 500 with these cauls being placed over one or more hat stringers in addition to hat stringer 402 on skin panel 202. As another example, a stringer having a cross-section with corners can be fabricated in addition to or in place of hat stringer 402 having a rounded cap.

Turning now to FIGS. 8-11, FIGURES illustrating a process for fabricating a caul is depicted in accordance with an illustrative embodiment. With reference first for FIG. 8, an illustration of a first ply on a tool for fabricating a caul is depicted in accordance with an illustrative embodiment. In this illustrative example, first ply 800 is laid up on tool 802 as part of a process for fabricating a caul. In this illustrative example, ply 800 can have unidirectional or multiple directional fibers.

Figure 9:
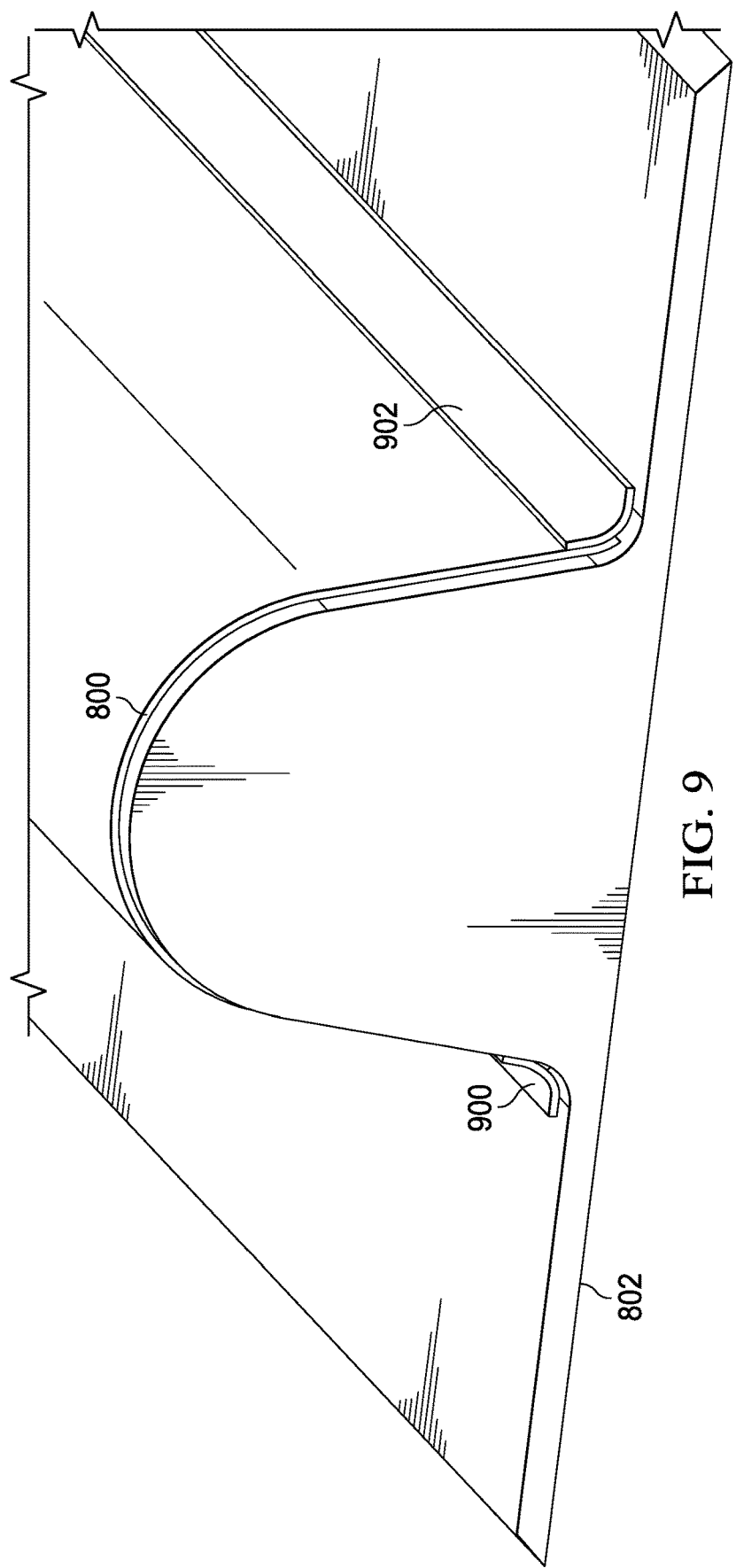
FIG. 9 is an illustration of a film placed on the tool in accordance with illustrative embodiment.

Turning now to FIG. 9, an illustration of a film placed on the tool is depicted in accordance with illustrative embodiment. As depicted, first film 900 and second film 902 are placed on first ply 800 laid up on tool 802. First film 900 and second film 902 can be adhesive films that reduce voids in fabricating the caul.

Figure 10:
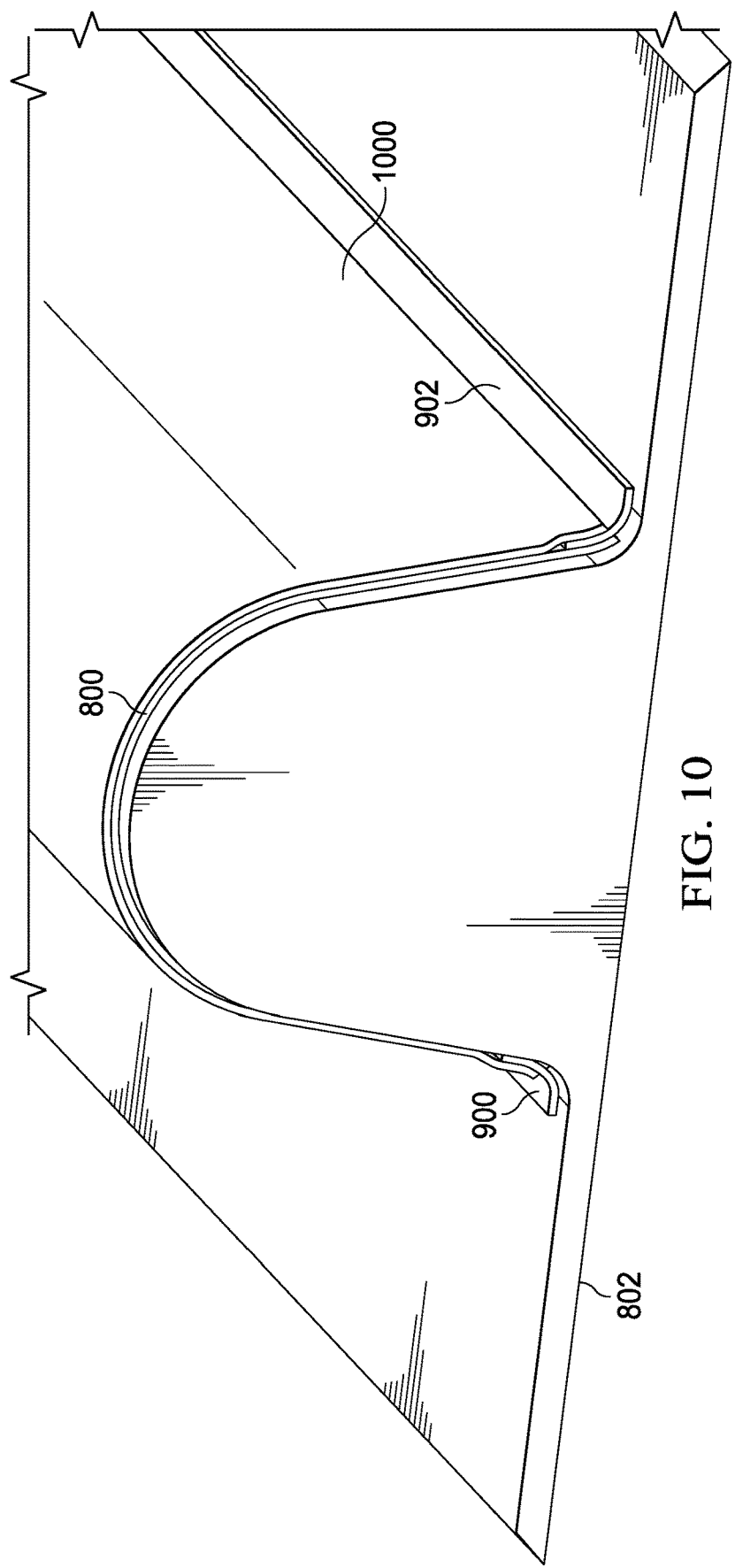
FIG. 10 is an illustration of a second ply on the tool in accordance with illustrative embodiment.

With reference next to FIG. 10, an illustration of a second ply on the tool is depicted in accordance with illustrative embodiment. As depicted, second ply 1000 is placed on first ply 800. Second ply 1000 also overlays first film 900 and second film 902 on tool 802.

Figure 11:
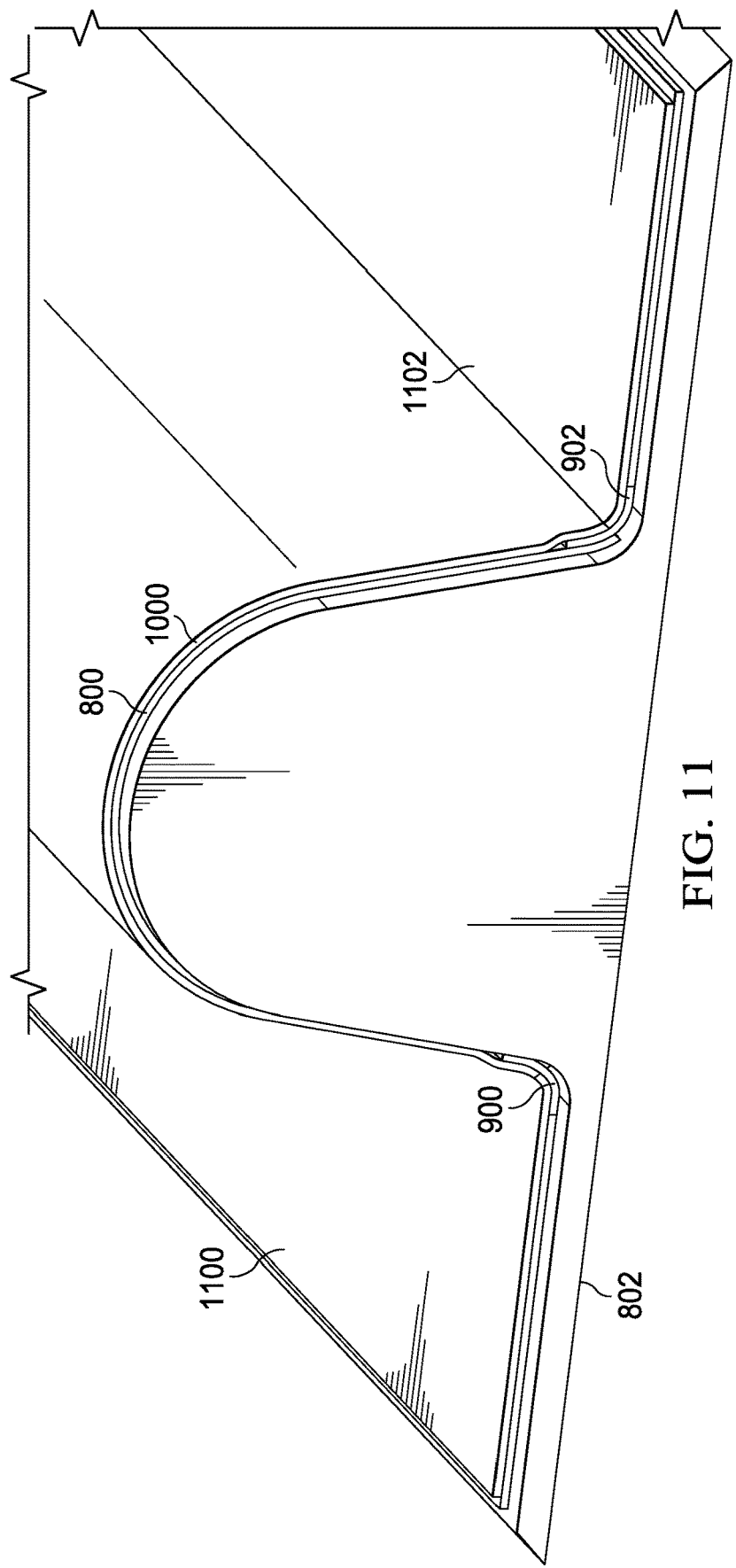
FIG. 11 is an illustration of flanges laid up on a tool in accordance with an illustrative embodiment.

Next in FIG. 11, an illustration of flanges laid up on a tool is depicted in accordance with an illustrative embodiment. First flange 1100 and second flange 1102 are laid up for the caul. These flanges are comprised of two plies. This layup of composite materials is cured to form a caul.

The illustration of the process for forming a composite using a caul in FIGS. 8-11 is presented as an example of one manner in which the composite part can be keyed using a caul sized to an expanded state of the composite part and occurs during curing to form the composite materials in the green state. This illustration is not meant to imply limitations to the manner in which the illustrative examples can be implemented.

For example, other cauls can be fabricated using other number of plies, such as three plies, five plies, 10 plies, or some other number of plies. Further, in other illustrative examples, the caul can be comprised of other types materials such as a metal, an alloy, a polycarbonate, or some other suitable type of material that can withstand curing temperatures. Further, the material can also be selected based on a desired coefficient of thermal expansion. In illustrative examples, the thermal coefficient of thermal expansion may be selected to be as small as possible to reduce size change during curing.

Figure 12:
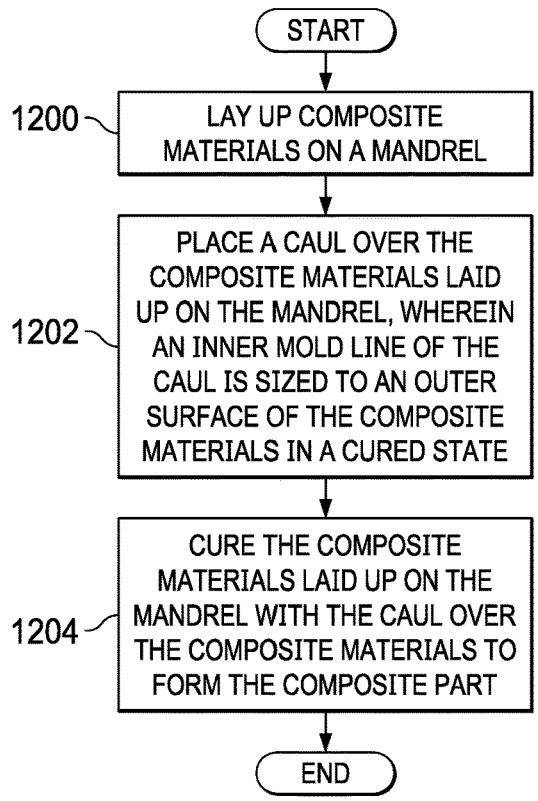
FIG. 12 is an illustration of a flowchart of a process for fabricating a composite part in accordance with an illustrative embodiment.

Turning next to FIG. 12, an illustration of a flowchart of a process for a fabricating a composite part is depicted in accordance with an illustrative embodiment. In some illustrative examples, the process in FIG. 12 can be implemented in hardware, software, or both that control fabrication equipment. In other illustrative examples, the process can comprise instructions that are sent to human operators to perform desired operations.

The process begins by laying up composite materials on a mandrel (operation 1200). The process places a caul over the composite materials laid up on the mandrel, wherein an inner mold line of the caul is sized to an outer surface of the composite materials in a cured state (operation 1202).

The process cures the composite materials laid up on the mandrel with the caul over the composite materials to form the composite part (operation 1204). The process terminates thereafter. In this example, the composite materials for the stringer are sandwiched between the inner mold line of the caul and the mandrel after curing performed in operation 1204. In curing the composite materials, the composite materials can expand to close the gap with inner mold line of the caul such that the composite materials in the cured state have dimensions within a tolerance for the design of the composite part. The composite materials for the stringer are sandwiched between the caul and the mandrel after curing. The composite part can be, for example, without limitation, a stringer, a hat stringer, and a skin panel with a hat stringer. The composite part can also include other components such as a skin panel in which the stringer is formed.

In operation 1204, the composite materials expand to an inner mold line of the caul during curing of the composite materials to form the composite part. In one illustrative example, in operation 1204, the mandrel expands to push the composite materials against the inner mold line of the caul during curing of the composite materials to form the composite part. In other words, the mandrel can cause the composite materials to expand against the surface of the inner mold line of the caul.

In another illustrative example, in operation 1204, the caul expands during curing such that the inner mold line of the caul defines dimensions for an outer surface of the composite part within a tolerance specified for the composite part. In other words, the inner mold line of the caul expands to the sizing of the composite part. The size of the caul may increase in some illustrative examples depending on the material used. Based on that expansion, the caul is sized such that the expansion of the caul results in the inner mold line having dimensions for the composite part.

Figure 13:
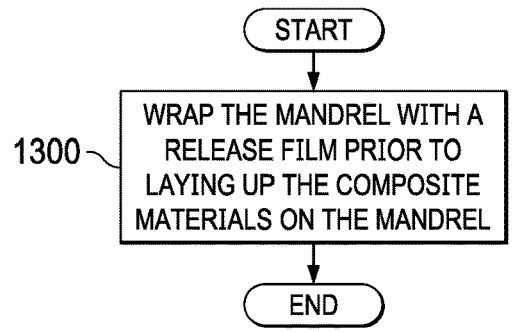
FIG. 13 is an illustration of a flowchart of a process for wrapping a mandrel with a release film in accordance with an illustrative embodiment.

Turning next to FIG. 13, an illustration of a flowchart of a process for wrapping a mandrel with a release film is depicted in accordance with an illustrative embodiment. The process illustrated in FIG. 13 is an example of an additional operation that can be performed with the operations in FIG. 12.

The process wraps the mandrel with a release film prior to laying up the composite materials on the mandrel (operation 1300). The process terminates thereafter.

Figure 14:
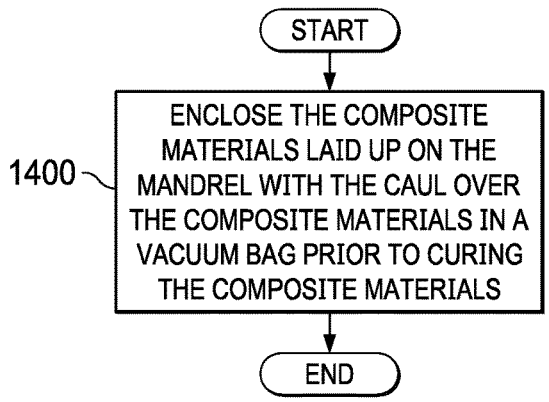
FIG. 14 is an illustration of a flowchart of a process for enclosing composite materials with the vacuum bag in accordance with an illustrative embodiment.

With reference to FIG. 14, an illustration of a flowchart of a process for enclosing composite materials with the vacuum bag is depicted in accordance with an illustrative embodiment. The process illustrated in FIG. 14 is an example of an additional operation that can be performed with the operations in FIG. 12.

The process encloses the composite materials laid up on the mandrel with the caul over the composite materials in a vacuum bag prior to curing the composite materials (operation 1400). The process terminates thereafter.

Figure 15:
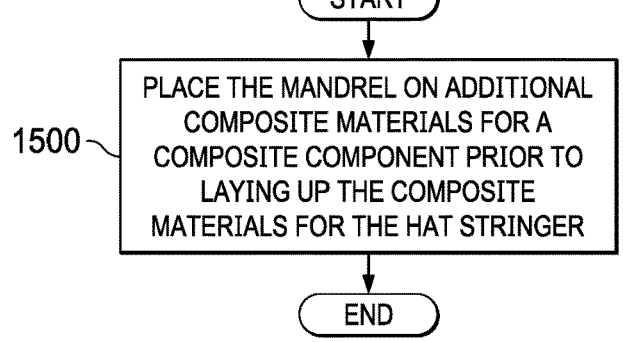
FIG. 15 is an illustration of a flowchart of a process for fabricating a composite part in accordance with an illustrative embodiment.

Turning to FIG. 15, an illustration of a flowchart of a process for a fabricating a composite part is depicted in accordance with an illustrative embodiment. The process illustrated in FIG. 15 is an example of an additional operation that can be performed with the operations in FIG. 12. In this illustrative example, the composite materials are for a hat stringer.

The process places placing the mandrel on second composite materials for a composite component prior to laying up the composite materials for the hat stringer (operation 1500) can process terminates thereafter.

Figure 16:
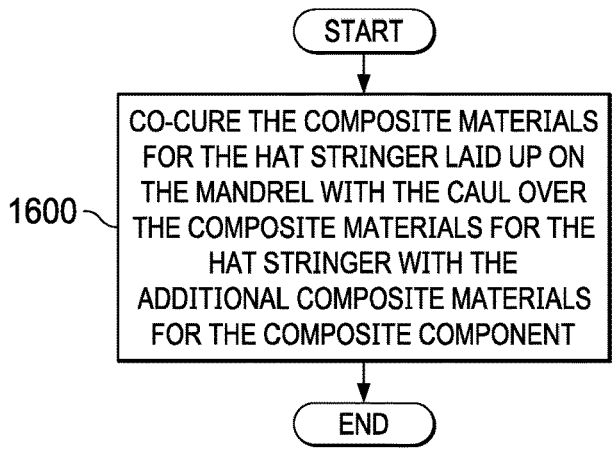
FIG. 16 is an illustration of a flowchart of a process for co-curing composite materials in accordance with an illustrative embodiment.

Turning to FIG. 16, an illustration of a flowchart of a process for co-curing composite materials is depicted in accordance with an illustrative embodiment. The process illustrated in FIG. 16 is an example of an implementation of operation 1204 in FIG. 12.

The process co-cures the composite materials for the hat stringer laid up on the mandrel with the caul over the composite materials for the hat stringer with additional composite materials for the composite component (operation 1600). The process terminates thereafter.

Figure 17:
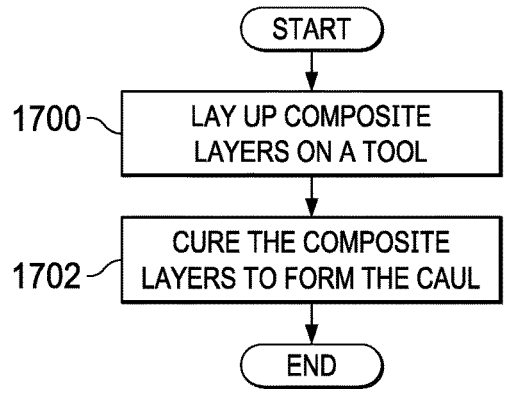
FIG. 17 is an illustration of a flowchart of a process for fabricating a caul in accordance with an illustrative embodiment.

Turning next to FIG. 17, an illustration of a flowchart of a process for a fabricating a caul is depicted in accordance with an illustrative embodiment. In some illustrative examples, the process in FIG. 12 can be implemented in hardware, software, or both that control fabrication equipment. In other illustrative examples, the process can comprise instructions provided are sent to human operators to perform desired operations.

The process begins by laying up composite layers on a tool (operation 1700). In this illustrative example, the tool defines an inner mold line for the caul. The composite layers can be comprised of a number of different types of materials. For example, the composite layers can be selected from at least one of a composite preform, a tow, a composite tape, a ply, or some other suitable material.

The process cures the composite layers to form the caul (operation 1702). The process terminates thereafter.

Figure 18:
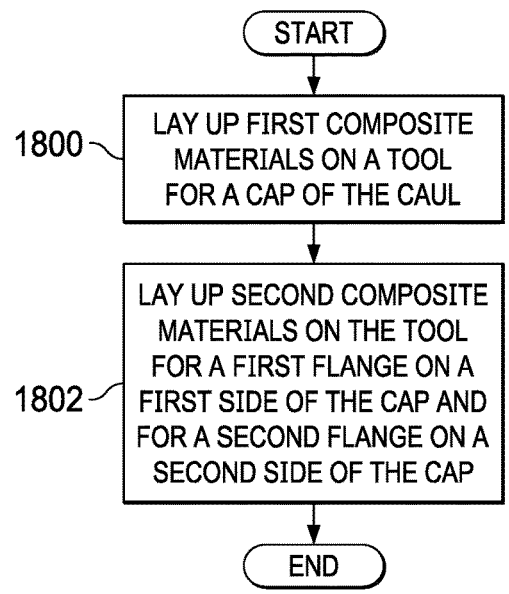
FIG. 18 is an illustration of a flowchart of a process for fabricating a caul in accordance with an illustrative embodiment.

Turning next to FIG. 18, an illustration of a flowchart of a process for a fabricating a caul is depicted in accordance with an illustrative embodiment. The process illustrated in FIG. 18 is an example of an implementation for operation 1700 in FIG. 17.

The process begins by laying up first composite materials on a tool for a cap of the caul (operation 1800). In operation 1800, the tool can define an inner mold line of a hat shape for the caul.

The process lays up second composite materials on the tool for a first flange on a first side of the cap and for a second flange on a second side of the cap (operation 1802). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware that can be used to control operation of fabrication equipment to manufacture composite parts. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

Figure 19:
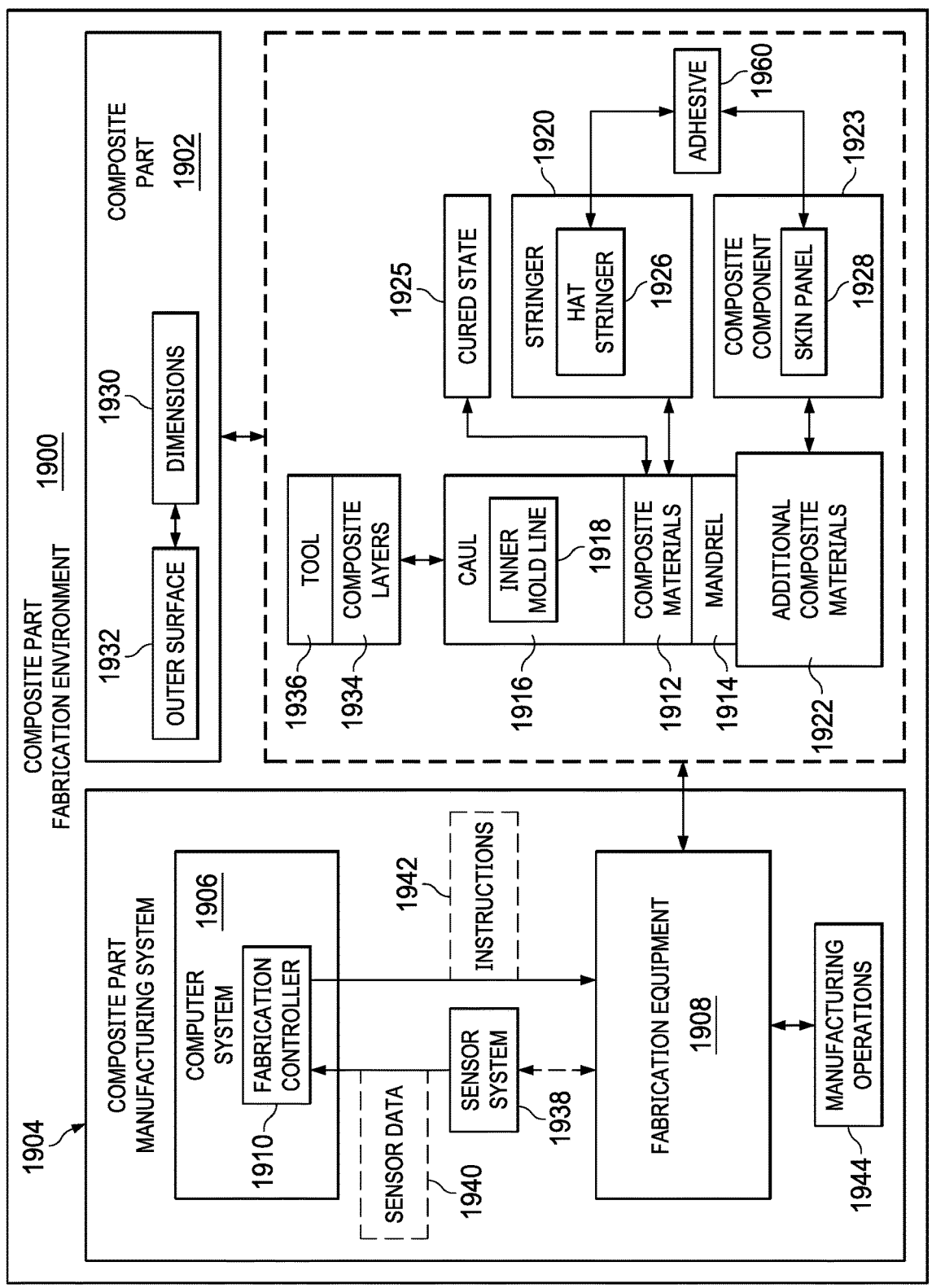
FIG. 19 is an illustration of a composite fabrication environment in accordance with an illustrative embodiment.

With reference now to FIG. 19, an illustration of a composite fabrication environment is depicted in accordance with an illustrative embodiment. In this illustrative example, composite part fabrication environment 1900 is an environment in which composite part 1902 can be fabricated using composite part manufacturing system 1904. Composite part 1902 can take a number of different forms. Composite part 1902 can have a single component or have multiple components. For example, composite part 1902 can be selected from at least one of a stringer, a hat stringer, a skin panel, or some other composite part.

For example, composite part 1902 can be a stringer. In other illustrative examples, composite part 1902 can be comprised of two components such as a stringer on a skin panel. In yet another illustrative example, composite part 1902 can be comprised of multiple stringers on a skin panel.

In this illustrative example, composite part manufacturing system 1904 comprises computer system 1906, fabrication equipment 1908, and fabrication controller 1910. Fabrication controller 1910 is located in computer system 1906. Fabrication controller 1910 can be implemented using software, hardware, or a combination of the two. Fabrication equipment 1908 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a robotic arm, a flatbed cutting machine, a laser cutter, a computer numerical control (CNC) cutting machine, a lathe, or other suitable types of equipment.

As depicted, fabrication controller 1910 can control the operation of fabrication equipment 1908 to laying up composite materials 1912 on mandrel 1914. Fabrication controller 1910 can also control fabrication equipment 1908 to place caul 1916 on composite materials 1912 laid up on mandrel 1914. In this example, inner mold line 1918 of caul 1916 is sized to an outer surface 1932 of composite materials 1912 in cured state 1925.

Fabrication controller 1910 can also control fabrication equipment 1908 to cure composite materials 1912 laid up on mandrel 1914 with caul 1916 on composite materials 1912 to form composite part 1902. In this illustrative example, composite materials 1912 can expand to inner mold line 1918 of caul 1916 during curing of the composite materials 1912 to form composite part 1902.

In one illustrative example, composite materials 1912 are for stringer 1920. With this example, fabrication controller 1910 controls fabrication equipment 1908 to place mandrel 1914 on additional composite materials 1922 for composite component 1923 prior to laying up composite materials 1912 for stringer 1920. In this illustrative example, stringer 1920 is hat stringer 1926.

With this example, fabrication controller 1910 can control fabrication equipment 1908 to co-cure composite materials 1912 for stringer 1920 laid up on mandrel with caul 1916 on composite materials 1912 for stringer 1920 with additional composite materials 1922 for composite component 1923. In one illustrative example, composite component 1923 can take the form of skin panel 1928.

In this illustrative example, adhesive 1960 can be used to bond hat stringer 1926 to skin panel 1928. Adhesive 1960 can enable slippage of hat stringer 1926 relative to skin panel 1928 during the expansion occurring during curing. For example, composite materials 1912 for stringer 1920 can be laid up on mandrel 1914 and on composite materials 1912 for skin panel 1928. Composite materials 1912 for stringer 1920 can be bonded to composite materials 1912 for skin panel 1928 using adhesive 1960. In this example, adhesive 1960 allows for slippage of stringer 1920 relative to skin panel 1928 during the expansion of stringer 1920 curing of these components.

In this illustrative example, mandrel 1914 can expand to push composite materials 1912 against inner mold line 1918 of caul 1916 during curing of composite materials 1912 to form composite part 1902. In another illustrative example, caul 1916 can expand during curing such that inner mold line 1918 of caul 1916 defines dimensions 1930 for outer surface 1932 of composite part 1902 within a tolerance specified for composite part 1902. In other words, caul 1916 can expand such that inner mold line 1918 has dimensions 1930 desired for outer surface 1932 of composite part 1902.

In this illustrative example, fabrication controller 1910 can also control fabrication equipment 1908 to fabricate caul 1916. For example, fabrication controller 1910 can control fabrication equipment 1908 to lay up composite layers 1934 on tool 1936. In this example, tool 1936 defines inner mold line 1918 for caul 1916. Fabrication controller 1910 can control fabrication equipment 1908 to cure composite layers 1934 to form caul 1916.

Fabrication controller 1910 can control the operation of fabrication equipment 1908 using sensor system 1938. As depicted, sensor system 1938 is a physical hardware system that detects information about fabrication equipment 1908, the environment around fabrication equipment 1908, or both, to generate sensor data 1940. Sensor system 1938 can be comprised of at least one of a camera system, a laser sensor, an ultrasonic sensor, a light detection and ranging scanner, an encoder, a rotary encoder, a temperature sensor, a pressure sensor, an accelerometer, or some other suitable type of sensor.

Sensor system 1938 can generate sensor data 1940 about the operation of fabrication equipment 1908. As depicted, sensor data 1940 can be used by fabrication controller 1910 to control the operation of fabrication equipment 1908. In this illustrative example, a portion or all of sensor system 1938 can be associated or connected to fabrication equipment 1908.

In this illustrative example, fabrication controller 1910 can use sensor data 1940 to generate instructions 1942. Instructions 1942 can be used to cause fabrication equipment 1908 to perform a number of manufacturing operations 1944. In this illustrative example, instructions 1942 can comprise at least one of commands, data, or other information that can control the operation of fabrication equipment 1908.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, additional operations can be performed by fabrication controller 1910 using fabrication equipment 1908 such as wrapping mandrel 1914 with a release film prior to laying up composite materials 1912 on mandrel 1914 and enclosing composite materials 1912 laid up on mandrel 1914 with caul 1916 on composite materials 1912 in a vacuum bag prior to curing composite materials 1912 to form composite part 1902.

The illustration of composite part fabrication environment 1900 in FIG. 19 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, fabrication controller 1910 can control fabrication equipment 1908 to manufacture multiple composite parts in addition to or in place of composite part 1902. These composite parts can be the same or different types of composite parts. In another illustrative example, instructions 1942 can be instructions used by human operators to operate fabrication equipment 1908.

Figure 20:
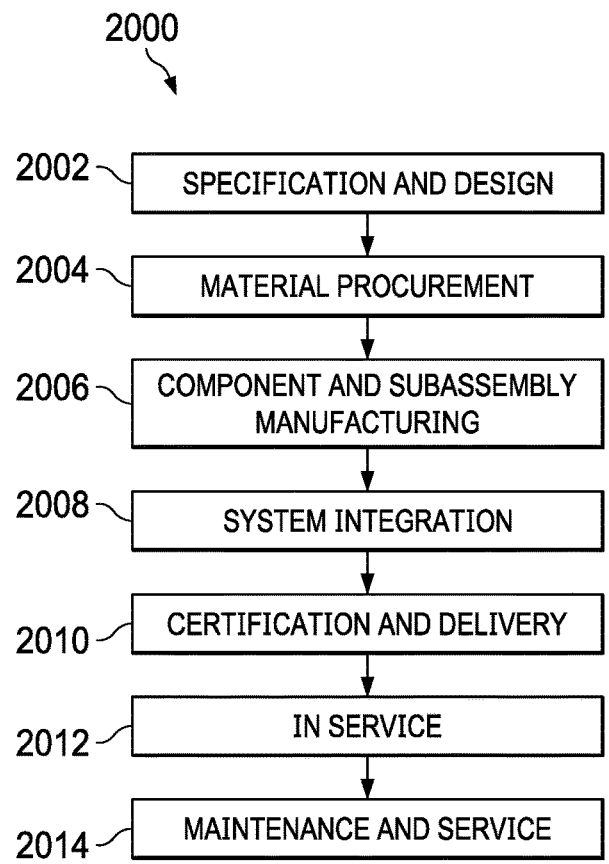
FIG. 20 is an illustration of an aircraft manufacturing and service method in accordance with an illustrative embodiment.
Figure 21:
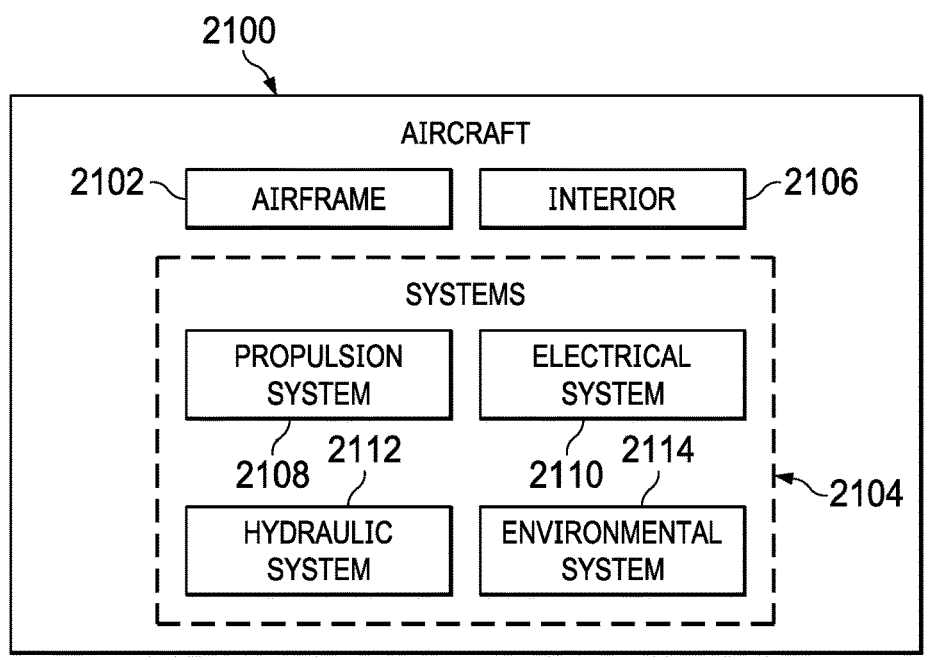
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of a block diagram of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

For example, composite part manufacturing system 1904 can be used to create composite parts during components and subassembly manufacturing 2006. Further, composite part manufacturing system 1904 can be used during maintenance and service 2014 to manufacture composite parts needed for various operations including modification, reconfiguration, refurbishment, and other maintenance or service.

Composite parts such as stringers or other types composite parts can be manufactured using cauls size to the cured inventions of the composite parts.

In the illustrative examples, the amount of at least one of rework or discarding and remanufacturing composite parts can be reduced.

Figure 22:
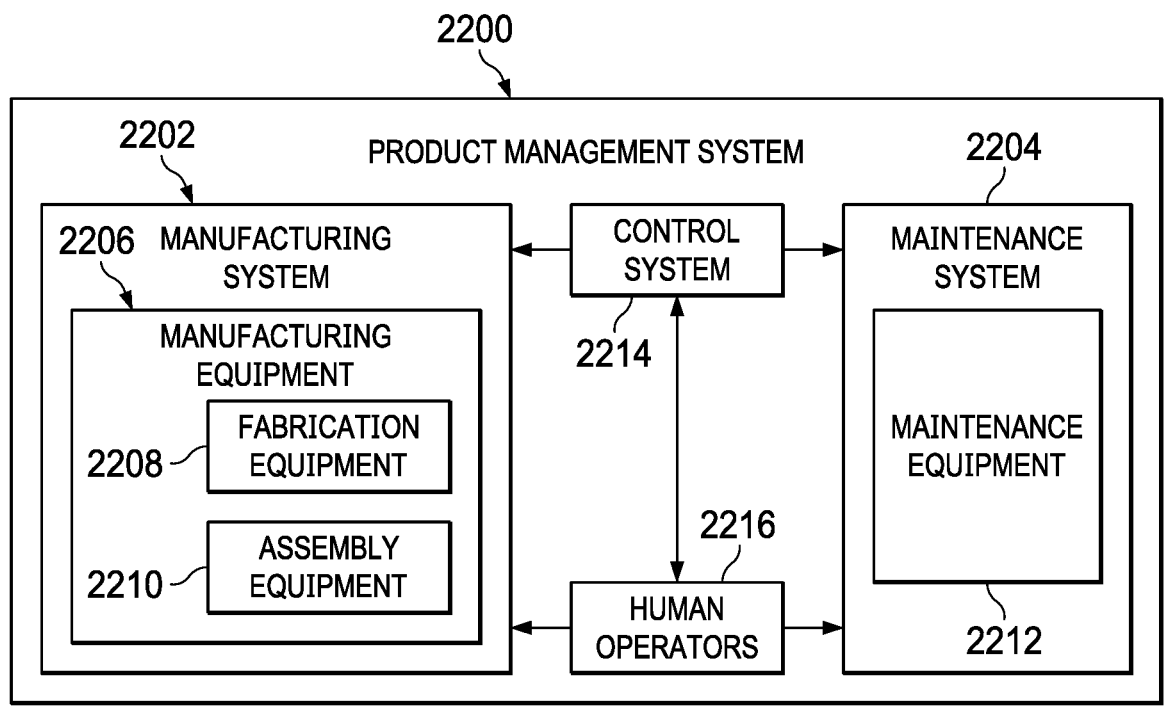
FIG. 22 is an illustration of a block diagram of a product management system in accordance with an illustrative embodiment.

Turning now to FIG. 22, an illustration of a block diagram of a product management system is depicted in accordance with an illustrative embodiment. Product management system 2200 is a physical hardware system. In this illustrative example, product management system 2200 includes at least one of manufacturing system 2202 or maintenance system 2204.

Manufacturing system 2202 is configured to manufacture products, such as aircraft 2100 in FIG. 21. As depicted, manufacturing system 2202 includes manufacturing equipment 2206. Manufacturing equipment 2206 includes at least one of fabrication equipment 2208 or assembly equipment 2210.

Fabrication equipment 2208 is equipment used to fabricate components for parts used to form aircraft 2100 in FIG. 21. For example, fabrication equipment 2208 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 2208 can be used to fabricate at least one of metal parts, composite parts, semiconductors, circuits, fasteners, ribs, skin panels, spars, antennas, or other suitable types of parts.

Assembly equipment 2210 is equipment used to assemble parts to form aircraft 2100 in FIG. 21. In particular, assembly equipment 2210 is used to assemble components and parts to form aircraft 2100 in FIG. 21. Assembly equipment 2210 also can include machines and tools. These machines and tools may be at least one of a robotic arm, a crawler, a faster installation system, a rail-based drilling system, or a robot. Assembly equipment 2210 can be used to assemble parts such as seats, horizontal stabilizers, wings, engines, engine housings, landing gear systems, and other parts for aircraft 2100 in FIG. 21.

In this illustrative example, maintenance system 2204 includes maintenance equipment 2212. Maintenance equipment 2212 can include any equipment needed to perform maintenance on aircraft 2100 in FIG. 21. Maintenance equipment 2212 may include tools for performing different operations on parts on aircraft 2100 in FIG. 21. These operations can include at least one of disassembling parts, refurbishing parts, inspecting parts, reworking parts, manufacturing replacement parts, or other operations for performing maintenance on aircraft 2100 in FIG. 21. These operations can be for routine maintenance, inspections, upgrades, refurbishment, or other types of maintenance operations.

In the illustrative example, maintenance equipment 2212 may include ultrasonic inspection devices, x-ray imaging systems, vision systems, drills, crawlers, and other suitable devices. In some cases, maintenance equipment 2212 can include fabrication equipment 2208, assembly equipment 2210, or both to produce and assemble parts that needed for maintenance.

Product management system 2200 also includes control system 2214. Control system 2214 is a hardware system and may also include software or other types of components. Control system 2214 is configured to control the operation of at least one of manufacturing system 2202 or maintenance system 2204. In particular, control system 2214 can control the operation of at least one of fabrication equipment 2208, assembly equipment 2210, or maintenance equipment 2212.

The hardware in control system 2214 can be implemented using hardware that may include computers, circuits, networks, and other types of equipment. The control may take the form of direct control of manufacturing equipment 2206. For example, robots, computer-controlled machines, and other equipment can be controlled by control system 2214. In other illustrative examples, control system 2214 can manage operations performed by human operators 2216 in manufacturing or performing maintenance on aircraft 2100 in FIG. 21. For example, control system 2214 can assign tasks, provide instructions, display models, or perform other operations to manage operations performed by human operators 2216. In these illustrative examples, fabrication controller 1910 in FIG. 19 can be implemented in control system 2214 to manage at least one of fabricating composite parts used in the manufacturing or maintenance of aircraft 2100 in FIG. 21.

In the different illustrative examples, human operators 2216 can operate or interact with at least one of manufacturing equipment 2206, maintenance equipment 2212, or control system 2214. This interaction can occur to manufacture aircraft 2100 in FIG. 21.

Of course, product management system 2200 may be configured to manage other products other than aircraft 2100 in FIG. 21. Although product management system 2200 has been described with respect to manufacturing in the aerospace industry, product management system 2200 can be configured to manage products for other industries. For example, product management system 2200 can be configured to manufacture products for the automotive industry as well as any other suitable industries.

Thus, the illustrative examples, provide a method, apparatus, system, and computer program product for fabricating a composite part. In one example, composite materials are laid up on a mandrel. A caul is placed over the composite materials laid up on the mandrel. An inner mold line of the caul is sized to an outer surface of the composite materials in a cured state. The composite materials laid up on the mandrel with the caul over the composite materials is cured to form the composite part. The composite materials expand to an inner mold line of the caul during curing of the composite materials to form the composite part.

With the use of cauls that are sized to composite parts in a completed or cured state, undesired inconsistencies can be decreased to a desired level. This desirable level can be specified in a design or specification for composite parts.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a composite part, the method comprising:
   laying up composite materials for a stringer on a mandrel;
   placing the mandrel on composite materials for a skin panel;
   placing a caul over the composite materials laid up on the mandrel, wherein a gap is present between an inner mold line of the caul and an outer surface of the composite materials on the mandrel in an uncured state, and wherein the inner mold line of the caul is sized to the outer surface of the composite materials on the mandrel in a cured state; and
   heat curing the composite materials laid up on the mandrel with the caul over the composite materials on the mandrel to form the composite part, wherein the mandrel expands to push the composite materials on the mandrel through the gap and against the inner mold line of the caul during heat curing of the composite materials on the mandrel to form the composite part.

2. The method of claim 1 further comprising:
   wrapping the mandrel with a release film prior to laying up the composite materials on the mandrel.

3. The method of claim 1 further comprising:
   enclosing the composite materials laid up on the mandrel with the caul over the composite materials on the mandrel in a vacuum bag prior to curing the composite materials.

4. The method of claim 1 wherein the placing the mandrel on the composite materials for the skin panel is performed prior to the laying up the composite materials for the stringer.

5. The method of claim 4, wherein curing the composite materials laid up on the mandrel with the caul over the composite materials on the mandrel to form the composite part comprises:
   co-curing the composite materials for the stringer laid up on the mandrel with the caul over the composite materials for the stringer with the composite materials for the skin panel.

6. The method of claim 1, wherein the composite materials for the stringer on the mandrel are for a hat stringer and further comprising:
   placing the mandrel on the composite materials for the skin panel prior to laying up the composite materials for the hat stringer.

7. The method of claim 1, wherein laying up composite materials for the stringer on the mandrel comprises:
   laying up the composite materials for the stringer on the mandrel and on the composite materials for the skin panel; and
   bonding the composite materials for the stringer to the composite materials for the skin panel using an adhesive, wherein the adhesive allows for slippage of the stringer relative to the skin panel during curing.

8. The method of claim 1, wherein curing the composite materials laid up on the mandrel with the caul over the composite materials on the mandrel to form the composite part comprises:
   curing the composite materials on the mandrel with the caul over the composite materials on the mandrel to form the composite part, wherein the caul expands during curing such that the inner mold line of the caul defines dimensions for the composite part within a tolerance specified for the composite part.

9. The method of claim 1 further comprising:
   laying up composite layers on a tool, wherein the tool defines the inner mold line for the caul; and
   curing the composite layers to form the caul.

10. The method of claim 9, wherein laying up the composite layers on the tool, wherein the tool defines the inner mold line for the caul comprises:
    laying up first composite materials on the tool for a cap of the caul, wherein the tool defines the inner mold line with a hat shape for the caul; and
    laying up second composite materials on the tool for a first flange on a first side of the cap and for a second flange on a second side of the cap.

11. The method of claim 1, wherein the composite materials is selected from at least one of a composite preform, a tow, a composite tape, and a ply.

12. The method of claim 1, wherein the mandrel is one of a solid mandrel and a solid bladder.

13. The method of claim 1, wherein the composite part is the stringer, a hat stringer, or the skin panel with the hat stringer.

14. A composite part manufacturing system comprising:
    a computer system; and
    a fabrication controller in the computer system, wherein the fabrication controller is configured to control fabrication equipment to perform the steps of:
       layup composite materials for a stringer on a mandrel;
       place the mandrel on composite materials for a skin panel;
       place a caul over the composite materials laid up on the mandrel, wherein a gap is present between an inner mold line of the caul and an outer surface of the composite materials on the mandrel in an uncured state, and wherein the inner mold line of the caul is sized to the outer surface of the composite materials on the mandrel in a cured state; and
       heat curing the composite materials laid up on the mandrel with the caul over the composite materials on the mandrel to form the composite part, wherein the mandrel expands to push the composite materials on the mandrel through the gap and against the inner mold line of the caul during heat curing of the composite materials on the mandrel to form the composite part.

15. The composite part manufacturing system of claim 14, wherein the fabrication controller controls the fabrication equipment to:
    place the mandrel on the composite materials for the skin panel prior to laying up the composite materials for the stringer.

16. The composite part manufacturing system of claim 15, wherein in curing the composite materials laid up on the mandrel with the caul over the composite materials on the mandrel to form the composite part, the fabrication controller controls the fabrication equipment to:

co-cure the composite materials for the hat stringer laid up on the mandrel with the caul over the composite materials for the hat stringer with the composite materials for the skin panel.

17. The composite part manufacturing system of claim 14, wherein the composite materials for the stringer on the mandrel are for a hat stringer and wherein the fabrication controller controls the fabrication equipment to:
place the mandrel on the composite materials for the skin panel prior to laying up the composite materials for the hat stringer.

18. The composite part manufacturing system of claim 14, wherein in curing the composite materials laid up on the mandrel with the caul over the composite materials on the mandrel to form the composite part, the fabrication controller controls the fabrication equipment to:
cure the composite materials on the mandrel with the caul over the composite materials on the mandrel to form the composite part, wherein the caul expands during curing such that the inner mold line of the caul defines dimensions for the composite part within a tolerance specified for the composite part.

19. The composite part manufacturing system of claim 14, wherein the fabrication controller controls the fabrication equipment to:
layup composite layers on a tool, wherein the tool defines the inner mold line for the caul; and
cure the composite layers to form the caul.

20. The composite part manufacturing system of claim 19, wherein in laying up composite layers on the tool, wherein the tool defines the inner mold line for the caul, the fabrication controller controls the fabrication equipment to:
layup first composite materials on the tool for a cap of the caul, wherein the tool defines the inner mold line with a hat shape for the caul; and
layup second composite materials on the tool for a first flange on a first side of the cap and for a second flange on a second side of the cap.

21. A method for fabricating a stringer, the method comprising:
laying up composite materials for the stringer on a mandrel;
placing the mandrel on composite materials for a skin panel;
placing a caul over the composite materials for the stringer laid up on the mandrel, wherein a gap is present between an inner mold line of the caul and the composite materials for the stringer prior to heat curing the composite materials for the stringer and wherein the inner mold line of the caul is sized to an outer surface of the composite materials on the mandrel in a cured state; and
heat curing the composite materials for the stringer laid up on the mandrel with the caul over the composite materials to form the stringer, wherein the mandrel expands to push the composite materials for the stringer through the gap and against the inner mold line of the caul during heat curing of the composite materials for the stringer to form the stringer such that the composite materials for the stringer are sandwiched between the caul and the mandrel after heat curing.

22. The method of claim 21, wherein laying up composite materials on the mandrel comprises:
laying up the composite materials for the stringer on the mandrel and laying up the composite materials for the skin panel; and
bonding the composite materials for the stringer to the composite materials for the skin panel using an adhesive, wherein the adhesive allows for slippage of the stringer relative to the skin panel during curing.

23. The method of claim 21 further comprising:
wrapping the mandrel with a release film prior to laying up the composite materials on the mandrel.

24. The method of claim 21 further comprising:
enclosing the composite materials laid up on the mandrel with the caul over the composite materials on the mandrel in a vacuum bag prior to curing the composite materials on the mandrel.

25. A computer program product for fabricating a composite part, the computer program product comprising:
a computer readable storage medium having program instructions embodied therewith, the program instructions executable by a computer system to cause the computer system to control fabrication equipment configured to perform a method of:
laying up composite materials for a stringer on a mandrel;
placing the mandrel on composite materials for a skin panel;
placing a caul over the composite materials laid up on the mandrel, wherein a gap is present between an inner mold line of the caul and an outer surface of the composite materials on the mandrel in an uncured state, and wherein the inner mold line of the caul is sized to the outer surface of the composite materials on the mandrel in a cured state; and
heat curing the composite materials laid up on the mandrel with the caul over the composite materials on the mandrel to form the composite part, wherein the mandrel expands to push the composite materials on the mandrel through the gap and against the inner mold line of the caul during heat curing of the composite materials on the mandrel to form the composite part.

* * * * *